United States Patent
Knudsen

(10) Patent No.: US 10,469,455 B2
(45) Date of Patent: Nov. 5, 2019

(54) DYNAMIC ENCRYPTION METHOD

(71) Applicant: Danmarks Tekniske Universitet, Kgs. Lyngby (DK)

(72) Inventor: Lars R. Knudsen, Fredensborg (DK)

(73) Assignee: Danmarks Tekniske Universitet, Kgs. Lyngby (DK)

(*) Notice: Subject to any disclaimer, the term of this patent is extended or adjusted under 35 U.S.C. 154(b) by 0 days.

(21) Appl. No.: 14/354,867

(22) PCT Filed: Oct. 26, 2012

(86) PCT No.: PCT/EP2012/071314
§ 371 (c)(1),
(2) Date: Apr. 28, 2014

(87) PCT Pub. No.: WO2013/060876
PCT Pub. Date: May 2, 2013

(65) Prior Publication Data
US 2014/0298013 A1    Oct. 2, 2014

Related U.S. Application Data

(60) Provisional application No. 61/553,390, filed on Oct. 31, 2011.

(30) Foreign Application Priority Data

Oct. 28, 2011   (GB) ................................. 1118672.3
Oct. 31, 2011   (EP) ................................. 11187289

(51) Int. Cl.
*H04L 29/06*      (2006.01)
*H04L 9/00*       (2006.01)

(52) U.S. Cl.
CPC .......... *H04L 63/0428* (2013.01); *H04L 9/00* (2013.01); *H04L 2463/101* (2013.01)

(58) Field of Classification Search
CPC ....................................... H04L 63/0428–0492
See application file for complete search history.

(56) References Cited

U.S. PATENT DOCUMENTS 5,742,686 A * 4/1998 Finley .................. G06F 21/602
                                                        380/28
6,529,602 B1 * 3/2003 Walker ...................... H04K 1/00
                                                        379/67.1

(Continued)

FOREIGN PATENT DOCUMENTS

JP    01-212041 A    8/1989
JP    07-162409 A    6/1995

(Continued)

OTHER PUBLICATIONS

International Search Report and Written Opinion received for PCT Patent Application No. PCT/EP2012/071314, dated Jan. 22, 2013, 11 pages.

(Continued)

*Primary Examiner* — Lynn D Feild
*Assistant Examiner* — Vadim Savenkov
(74) *Attorney, Agent, or Firm* — Morrison & Foerster LLP

(57) ABSTRACT

Disclosed is a method of transmitting a data set using encryption, wherein the method comprises the steps of: selecting a first encryption technique, wherein said first encryption technique comprises a first encryption algorithm for encrypting plain data into cipher data, and a first decryption algorithm for on provision of a specific key, decrypting cipher data and reproduce plain data; encrypting the first data package comprising plain data, using a first encryption program implementing the first encryption algorithm of said first encryption technique, creating a first encrypted data package comprising cipher data; obtaining a first decryption program; and transmitting said first decryption program and said first encrypted data package to a receiver, wherein the first decryption, upon provision of the specific key and the first encrypted data package, will decrypt the cipher data in the first encrypted data package and reproduce the plain data of the first data package.

15 Claims, 2 Drawing Sheets

(56) References Cited

U.S. PATENT DOCUMENTS

| | | | |
|---|---|---|---|
| 6,671,810 B1 | 12/2003 | Jardin et al. | |
| 8,315,363 B2* | 11/2012 | Phelps | H04M 3/42221 370/352 |
| 2001/0042124 A1* | 11/2001 | Barron | 709/227 |
| 2002/0184485 A1 | 12/2002 | Dray, Jr. et al. | |
| 2003/0182576 A1* | 9/2003 | Morlang | H04L 63/0428 713/171 |
| 2003/0191951 A1* | 10/2003 | Cross | H04L 63/0442 713/189 |
| 2004/0193871 A1* | 9/2004 | Seshadri | H04L 63/0428 713/154 |
| 2005/0063002 A1* | 3/2005 | Sugahara | 713/150 |
| 2005/0163316 A1* | 7/2005 | Wing | H04L 29/06027 380/257 |
| 2007/0172066 A1* | 7/2007 | Davin | H04L 9/12 380/262 |
| 2007/0195955 A1* | 8/2007 | Cochran | H04K 1/00 380/247 |
| 2008/0170689 A1* | 7/2008 | Boubion | H04W 12/04 380/260 |
| 2008/0307217 A1* | 12/2008 | Yukimatsu et al. | 713/150 |
| 2011/0222688 A1* | 9/2011 | Graham | H04L 63/0428 380/247 |

FOREIGN PATENT DOCUMENTS

| | | | | |
|---|---|---|---|---|
| JP | 08-316951 | A | 11/1996 | |
| JP | 10-41934 | A | 2/1998 | |
| JP | 10-215243 | A | 8/1998 | |
| JP | 10-242956 | A | 9/1998 | |
| JP | 2000-89667 | A | 3/2000 | |
| JP | 2003-17595 | A | 1/2003 | |
| JP | 2003-324423 | A | 11/2003 | |
| JP | 2004187230 | A | 7/2004 | |
| WO | 1997/48207 | A1 | 12/1997 | |
| WO | WO 2007120006 | A1 * | 10/2007 | H04K 1/00 |

OTHER PUBLICATIONS

International Preliminary Report on Patentability received for PCT Patent Application No. PCT/EP2012/071314, dated May 8, 2014, 8 pages.

"CryptoZip", ZipGenius Version 1.24, available online at URL:http://www.zipgenius.com/index.php?id=178, Mar. 18, 2011, 3 pages.

Ritter, Terry, "Multiciphering and Random Cipher Selection in Shannon", Jun. 27, 2001, 14 pages.

"Self Decrypting Packages", Invisible Secrets, available online at URL:http://www.invisiblesecrets.com/email-encryption-software.html, Feb. 11, 2010, 1 page.

Office Action received for Japanese Patent Application No. 2014/537643, dated Nov. 7, 2016, 6 Pages (3 pages of English Translation and 3 pages of Official Copy).

Office Action received for Japanese Patent Application No. 2014537643, dated Jul. 15, 2016, 26 pages (14 pages of English Translation and 12 pages of Official Copy).

* cited by examiner

DYNAMIC ENCRYPTION METHOD

CROSS REFERENCE TO RELATED APPLICATIONS

This application is a U.S. National Phase patent application of PCT/EP2012/071314, filed on Oct. 26, 2012, which claims priority to United Kingdom Patent Application No. 1118672.3, filed on Oct. 28, 2011, U.S. Patent Application No. 61/553,390, filed on Oct. 31, 2011, and European Patent Application No. 11187289.1, filed on Oct. 31, 2011, each of which is hereby incorporated by reference in the present disclosure in its entirety.

The present invention relates to an encryption method. It is particularly, but not exclusively, concerned with secret key cryptography and its features can also be applied to public key cryptography.

BACKGROUND

The traditional disadvantage of secret key cryptography is that the key has to be exchanged between the parties. Public key cryptography such as RSA, by contrast, relies on a public key and a private key and there is no need to exchange keys with another party, with the threat of having the key stolen or revealed. A disadvantage of public key systems is speed. Due to the complexity of the encryption algorithms used in many public-key systems, they can be far slower than secret key systems. A secret key encryption algorithm can be considerably faster and yet provide comparable encryption strength. It has been proposed to use public key encryption to transmit a secret key, and thereafter to use secret key encryption.

Known encryption methods rely upon algorithms that are widely published. Popular systems such as RSA may be built into programs such as Microsoft Explorer or Mozilla Firefox. Security would be increased if the encryption method used for any particular data to be transmitted was unknown, but in conventional systems the receiver must be provided with an application that will decrypt cipher text into plain text and it is relatively easy to determine which system is being used.

SUMMARY

According to a first aspect the invention relates to a method of transmitting a data set using encryption, wherein the data set comprises a first data package, and wherein the method comprises the steps of:
  selecting a first encryption technique, wherein said first encryption technique comprises a first encryption algorithm for encrypting plain data into cipher data, and a first decryption algorithm for on provision of a specific key, e.g. a first key, decrypting cipher data and reproduce plain data;
  encrypting the first data package comprising plain data, using a first encryption program implementing the first encryption algorithm of said first encryption technique, creating a first encrypted data package comprising cipher data;
  obtaining a first decryption program implementing the first decryption algorithm of said first encryption technique; and
  transmitting said first decryption program and/or said first encrypted data package to a receiver,
  wherein the first decryption program being such that at the receiver, upon provision of the specific key and the first encrypted data package, the first decryption program will decrypt the cipher data in the first encrypted data package and reproduce the plain data of the first data package.

Selecting a first encryption technique may comprise automatically selecting a first encryption technique from a plurality of encryption techniques with an encryption management system In accordance with this aspect of the invention, it is not necessary for the receiving apparatus to have, pre-installed, a suitable decryption application to match the encryption technique. It is not necessary for the recipient of the data to negotiate which encryption technique has been used, and there is no need for communication between the sender and receiver to identify the technique which will be used. The requirements for decrypting the data are entirely self-contained within the decryption program and there is no need for the permanent installation of a decryption application or an application including a decryption routine on the receiving apparatus. Of course, the decryption routine may need access to standard features of the operating system which will be running on the receiving apparatus. One of the initial steps may be to specify the operating system of the target receiving apparatus. A programming language for the program will be chosen that is compatible with the target operating system.

A first encryption technique may be selected automatically without user selection. The sender has access to a plurality of encryption techniques and one of these is selected for a particular message. This could be a matter of personal choice by the sender, or could be in accordance with a set rota, or could be on a random basis. If the sender is not responsible for the choice of encryption technique, that task being left instead to software serving as an encryption management system, then the arrangement may be such that not even the sender knows which encryption technique has been used for any particular message.

If an attacker intercepts a message transmitted in accordance with the invention, there is additional secrecy because the attacker must attempt to identify the decryption routine. Not until that has been done, could an attacker attempt to break the encryption technique. If the program is in the form of executable code, then there is the additional obstacle for an attacker that the executable code must be de-compiled into a higher language that can be understood, before attempting to identify the decryption routine.

If the program is not in the form of executable code, it will need to be compiled at the receiving apparatus before being run.

The first decryption program and the encrypted data package may be transmitted in a combined data package. The combined data package may be compiled into executable code prior to being transmitted. This may increase the security further. The step of transmitting the first decryption program may be omitted, in particular if a mapping function is employed as described below.

In some embodiments, the first decryption program and the encrypted data package are transmitted in two different data packages.

The decryption program(s) may be encrypted before being transmitted to the receiver e.g. using a standard encryption technique.

In some embodiments, the step of selecting an encryption technique comprises selecting an encryption technique from a plurality of encryption techniques. The plurality of encryption techniques may comprise at least one hundred encryption techniques. By selecting between a large number of encryption techniques the task of breaking the encryption becomes even more complicated. The plurality of encryption techniques may comprise at least one thousand different encryption techniques, such as at least one million encryption techniques.

The plurality of encryption techniques may include or consist of variants of a basic encryption technique. The basic encryption technique may be a block cipher or a stream cipher. Key whitening may be used to create customised variants of the block cipher and/or stream cipher. Module encryption may be used to create variant ciphers.

In some embodiments, the encryption technique is selected by an encryption management system. Thereby, it is possible to use different encoding strategies on different hardware terminals or devices. This further increases security since an attacker or other undesired person being in possession of a stolen device using the method and system cannot derive encoding strategies employed by other devices or terminals from the stolen device.

The encryption management system preferably has access to a plurality of encryption techniques. There could be a library of encryption techniques. Alternatively, or additionally, there could be a basic technique which can be modified into a series of customised different techniques e.g. by an encryption technique generating program.

It is possible that some recipients may be reluctant to receive or execute program code from another party. This could be handled in a number of ways. For example, the sender could use a data integrity mechanism and send check code together with the other data. The receiving apparatus would check whether the received code is authentic before processing it. The integrity check preferably depends upon using the secret key. Additionally or alternatively, the code could be executed in a protected programming environment such as Java, to limit the risk of hostile code.

The program could be provided in a compressed form requiring de-compression before it can be run.

The key may be in the form of a password which a user enters manually, and that could for example optionally be stored in a password file of the operating system so as to be available automatically if the approved user is logged on to the data processing apparatus. Alternatively, the key may be invisible to the user and stored in a location which is secure and to which the program has access.

In some embodiments, the step of selecting an encryption technique comprises selecting an encryption technique from a plurality of encryption techniques dependent on a random and/or pseudo random event.

The random/pseudo random event may be an output from a random number generator. Consequently, an attacker would not be able to predict the chosen encryption technique.

The random number generator may select a seed value dependent on an internal state in the transmitter apparatus e.g. an internal clock value and/or an external value e.g. the amount of traffic on a specific server.

In some embodiments, the data set further comprises a second data package, and wherein the method further comprises the steps of:
  encrypting the second data package comprising plain data, using the first encryption program, creating a second encrypted data package comprising cipher data;
  transmitting said second encrypted data package to a receiver,
  wherein the first decryption program further being such that at the receiver, upon provision of the specific key and the second encrypted data package, the first decryption program will decrypt the cipher data in the second encrypted data package and reproduce the plain data of the second data package.

Consequently, by using the selected encryption technique to encrypt a plurality of data packages the system may be used for encrypting a stream of data e.g. a telephone conversation and/or a video telephone conversation.

In some embodiments, the first decryption program is compiled into an executable program prior to being transmitted. Consequently, the first decryption program may be directly executed at the receiving apparatus.

In some embodiments, the first encryption technique is a custom encryption technique generated using an encryption technique generating program.

In some embodiments, the data set further comprises a third data package, wherein the method further comprises the steps of:
  selecting a second encryption technique, wherein said second encryption technique comprises a second encryption algorithm for encrypting plain data into cipher data, and a second decryption algorithm for on provision of a specific key, e.g. the first key or a second key different from the first key, decrypting cipher data and reproduce plain data;
  encrypting the third data package comprising plain data, using a second encryption program implementing the second encryption algorithm of said second encryption technique, creating a third encrypted data package comprising cipher data;
  obtaining a second decryption program implementing the second decryption algorithm of said second encryption technique; and
  transmitting said second decryption program and said third encrypted data package to a receiver,
  wherein the second decryption program being such that at the receiver, upon provision of the specific key and the third encrypted data package, the second decryption program will decrypt the cipher data in the third encrypted data package and reproduce the plain data of the third data package.

Attacks on secret key cryptosystems, in particular, often require a huge amount of inputs and outputs from the encryption algorithm. If the encryption of many and/or long plain texts is split between several secure encryption techniques, any one system will be used to encrypt few plain text blocks and the chance of a successful cryptanalytic technique will decrease.

In some embodiments, the method further comprises the steps of:
  obtaining a mapping function that specifies the encryption technique(s) used for encrypting particular data package(s); and
  wherein the encryption technique used for encrypting a particular data package is determined by the mapping function and the mapping function is directly or indirectly available to the receiver, whereby different encryption techniques may be used for different data packages in an unpredictable way. By using a specific mapping function, the step of transmitting the decryption program may be omitted in the method, thereby reducing the bandwidth requirements.

The mapping function may be directly or indirectly available to the receiver by being stored in the receiving apparatus and/or being available directly or indirectly from a server communicating with the receiver through a network e.g. the internet.

The mapping function may be indirectly available to the receiver if the mapping function is generated from a seed value, where the seed value is available to the receiver.

In some embodiments, the method further comprises the steps of:

transmitting the mapping function or a value or parameter(s) associated with the mapping function to the receiver.

Consequently, the security of the encryption is increased, as an interceptor would be unaware of both the used encryption techniques and which encrypted data packages are encrypted with the same encryption technique. This may allow less computational complex encryption techniques to be used without jeopardizing security, thereby decreasing the processing requirements of the receiving and transmitting apparatus.

The mapping function or value associated with the mapping function may be encrypted prior to being transmitted. The mapping function may be part of the first data package. The mapping function may be a simple list and/or an algorithm. The mapping function may be randomly and/or pseudo randomly generated. The different decryption programs and the mapping function may be transmitted to the receiver at the beginning of the transmission.

A value or parameter associated with the mapping function may be a single value or a list of values. These may be generated during encryption and at least partly communicated to a receiver.

In some embodiments, the entire data set is transmitted contiguous in a single data package or in a plurality of data packages transmitted with an insignificant time gap between the individual data packages.

An insignificant time gap may be a time gap below 5 seconds, below 1 second, below 500 ms, below 200 ms, below 50 ms or below 20 ms.

In some embodiments, the method further comprises transmitting instructions that signals to the receiver that the transmission has finished, the instructions being such that at the receiver the first decryption program is deleted. This further increases security since an attacker or other undesired person being in possession of a stolen device using the method and system cannot derive encoding and/or decryption strategies employed by other devices or terminals from the stolen device.

Consequently, the decryption program is only available to the receiver when needed. This may reduce the amount of storage used by the method at the receiving apparatus. Additionally, a more secure system is provided as a library of "old" decryption programs is prevented from being built at the receiving apparatus. Thus, an attacker gaining access to a receiving apparatus is prevented from obtaining any information on the decryption programs previously used.

According to a second aspect the invention relates to a method of transmitting a first data set using encryption and a second data set using encryption, wherein the transmission of the first data set and the transmission of the second data set is performed using a method as specified above, wherein there is a significant temporal gap between the end of the transmission of the first data set and the start of the transmission of the second data set, and wherein the selected encryption technique used for the transmission of the first data set differs from the selected encryption technique used for the transmission of the second dataset.

A significant time gap may be a time gap above 20 ms, above 50 ms, above 200 ms, above 500 ms, above 1 second or above 5 seconds.

According to a third aspect the invention relates to a system for transmitting and receiving data using encryption, wherein the system comprises a receiving apparatus for receiving encrypted data and a transmitting apparatus for transmitting encrypted data, wherein the system is configured to transmit a data set comprising a first data package, using encryption by:

selecting a first encryption technique, wherein said first encryption technique comprises a first encryption algorithm for encrypting plain data into cipher data, and a first decryption algorithm for on provision of a specific key, e.g. a first key, decrypting cipher data and reproduce plain data;

obtaining a first decryption program implementing the first decryption algorithm of said first encryption technique; and transmitting said first decryption program to said receiving apparatus;

encrypting in the transmitting apparatus, the first data package comprising plain data, using a first encryption program implementing the first encryption algorithm of said first encryption technique, creating a first encrypted data package comprising cipher data;

transmitting from the transmitting apparatus the first encrypted data package to the receiving apparatus; and decrypting in the receiving apparatus using the first decryption program and the specific key the first encrypted data package, wherein the plain data of the first data package is reproduced an made available to the receiving apparatus.

In the system selecting an encryption technique, e.g. the first encryption technique and/or a second encryption technique, may comprise automatically selecting an encryption technique from a plurality of encryption techniques with an encryption management system. The receiving apparatus and/or transmitting apparatus may comprise a processing unit. The receiving apparatus and/or transmitting apparatus may be a personal computer or a mobile terminal e.g. a smart phone. A single apparatus may function as both a receiving apparatus and a transmitting apparatus. Thus, when the system and/or apparatus is used for encrypting a telephone conversation between two mobile terminals or devices, each mobile terminal may function as both a transmitting apparatus and a receiving apparatus.

One or more of the steps of selecting a first encryption technique, obtaining a first decryption program implementing the first decryption algorithm of said first encryption technique, and transmitting said first decryption program to said receiving apparatus, may be performed by the transmitting apparatus. Alternatively/additionally one or more of the steps may be performed by an encryption management apparatus e.g. the encryption management apparatus may select the first encryption technique and subsequently transmit the first decryption program to the receiving apparatus. The encryption management system may further enable the transmitting apparatus to know the selected first encryption technique e.g. by transmitting information indicative of the selected first encryption technique and/or transmitting the first encryption program to the transmitting apparatus. The encryption management system may be a server connected to a network e.g. a server connected to the internet.

In some embodiments, the receiving apparatus is further configured to delete the first decryption program after the transmission of the data set is completed.

In some embodiments, the system is configured to transmit the entire data set contiguous in a single data package or in a plurality of data packages transmitted with an insignificant time gap between the individual data packages.

In some embodiments, the first encryption technique is selected from a plurality of encryption techniques.

In some embodiments, the first encryption technique is selected by an encryption management system.

In some embodiments, the step of selecting an encryption technique comprises selecting an encryption technique from a plurality of encryption techniques dependent on a random and/or pseudo random event.

In some embodiments, the data set further comprises a second data package and the system is further configured to:
  encrypting the second data package comprising plain data, using the first encryption program of said first encryption technique, creating a second encrypted data package comprising cipher data;
  transmitting said second encrypted data package to a receiver,
  wherein the first decryption program being such that at the receiver, upon provision of the specific key and the second encrypted data package, the decryption program will decrypt the cipher data in the second encrypted data package and reproduce the plain data of the second data package.

In some embodiments, the first decryption program is compiled into an executable program prior to being transmitted.

In some embodiments, the first encryption technique is a custom encryption technique generated using an encryption technique generating program.

In some embodiments, the data set further comprises a third data package and the system further is configured to:
  selecting a second encryption technique, wherein said second encryption technique comprises a second encryption algorithm for encrypting plain data into cipher data, and a second decryption algorithm for on provision of a specific key, e.g. the first key or a second key different from the first key, decrypting cipher data and reproduce plain data;
  obtaining a second decryption program implementing the second decryption algorithm of said second encryption technique; and
  transmitting said second decryption program to said receiving apparatus;
  encrypting in the transmitting apparatus the third data package comprising plain data, using a second encryption program implementing the second encryption algorithm of said second encryption technique, creating a third encrypted data package comprising cipher data;
  transmitting from the transmitting apparatus the third encrypted data package to the receiving apparatus; and
  decrypting in the receiving apparatus using the second decryption program and the specific key the third encrypted data package, wherein the plain data of the third data package is reproduced and made available to the receiving apparatus.

Selecting a second encryption technique may comprise automatically selecting a second encryption technique from a plurality of encryption techniques, e.g. with an encryption management system.

In some embodiments, the system further is configured to perform a second transmission wherein there is a temporal gap between the end of the first transmission and the start of the second transmission, and wherein the selected encryption technique used for the first transmission differs from the selected encryption technique used for the second transmission.

In some embodiments, the system is further configured to:
  obtaining a mapping function that specifies the encryption techniques used for encrypting particular data packages; and
  making the mapping function available to the receiving apparatus;
  wherein the encryption technique used for encrypting a particular data package, in the transmitting apparatus, is determined by the mapping function, and wherein, in the receiving apparatus, a particular decryption program to use for decrypting a particular encrypted data package, is selected from a plurality of decryption programs by using information from the mapping function.

In some embodiments, the step of making the mapping function available to the receiving apparatus comprises transmitting the mapping function or a value associated with the mapping function to the receiving apparatus.

According to a fourth aspect the invention relates to a method of receiving and decrypting an encrypted data set, wherein the encrypted data set comprises a first encrypted data package, wherein the method comprises the steps of:
  receiving a first decryption program and the first encrypted data package, wherein the first encrypted data package comprises cipher data;
  decrypting the first encrypted data package by providing the first decryption program with the first encrypted data package and a specific key, creating a first data package comprising plain text.

In some embodiments, the encrypted data set further comprises a second encrypted data package, and wherein the method further comprises the steps of:
  receiving the second encrypted data package, wherein the second encrypted data package comprises cipher data;
  decrypting the second encrypted data package by providing the first decryption program with the second encrypted data package and the specific key, creating a second data package comprising plain text.

In some embodiments, the first decryption program comprises compiled executable code.

In some embodiments, the encrypted data set further comprises a third encrypted data package, wherein the method further comprises the steps of:
  receiving a second decryption program and said third encrypted data package;
  decrypting the third encrypted data package by providing the second decryption program with the third encrypted data package and a specific key, creating a third data package comprising plain text.

In some embodiments, the method further comprises the step of:
  obtaining a mapping function that specifies the encryption techniques used for encrypting particular data packages;
  wherein a particular decryption program to use for decrypting a particular data package, is selected from a plurality of decryption programs by using information from the mapping function.

In some embodiments, the step of obtaining a mapping function that specifies the encryption techniques used for encrypting particular data packages comprises receiving a mapping function that specifies the encryption techniques used for encrypting particular data packages.

In some embodiments, the entire data set is received contiguous in a single data package or in a plurality of data packages received without a significant time gap between the individual data packages.

In some embodiments, the method further comprises receiving instructions that signals that the transmission of the data set has finished, and deleting the first decryption program in response to the received instructions.

According to a fifth aspect the invention relates to a transmitting apparatus configured to encrypt and transmit a data set using a method as specified above.

According to sixth aspect the invention relates to a receiving apparatus configured to receive and decrypt an encrypted data set, using a method as specified above.

The method may be used for encrypting telephone calls. For example, a first encryption technique may be used during a first telephone call and a second encryption technique may be used for a second telephone call. A first encryption technique and a second encryption technique may be used for bidirectional communication during a telephone call. For example, during a telephone call between person A and person B, a first device (person A) selects the first encryption technique and transmits data packages to a second device (person B) according to the first encryption technique, and optionally the second device (person B) selects the second encryption technique and transmits data packages to the first device (person B) according to the second encryption technique.

Disclosed is a method of transmitting a data set using encryption, wherein the data set comprises a first data package, and wherein the method comprises automatically selecting a first encryption technique from a plurality of encryption techniques with an encryption management system, wherein said first encryption technique comprises a first encryption algorithm for encrypting plain data into cipher data, and a first decryption algorithm for on provision of a specific key, decrypting cipher data and reproduce plain data; encrypting the first data package comprising plain data, using a first encryption program implementing the first encryption algorithm of said first encryption technique, creating a first encrypted data package comprising cipher data; transmitting information representative of a first decryption program implementing the first decryption algorithm of said first encryption technique; and transmitting said first encrypted data package to a receiver, wherein the first decryption program being such that at the receiver, upon provision of the specific key and the first encrypted data package, the first decryption program will decrypt the cipher data in the first encrypted data package and reproduce the plain data of the first data package. The method may comprise obtaining the first decryption program implementing the first decryption algorithm of said first encryption technique, e.g. based on the information representative of the first decryption program. The step of transmitting information representative of a first decryption program implementing the first decryption algorithm of said first encryption technique may consist of or comprise transmitting said first decryption program and/or a mapping function or mapping function parameter(s) to the receiver.

The different aspects of the present invention can be implemented in different ways including the methods for transmitting a data set using encryption, the methods of receiving and decrypting an encrypted dataset, the systems transmitting and receiving data using encryption, the transmitting apparatuses and the receiving apparatuses, each yielding one or more of the benefits and advantages described in connection with at least one of the aspects described above, and each having one or more preferred embodiments corresponding to the preferred embodiments described in connection with at least one of the aspects described above and/or disclosed in the dependant claims.

Furthermore, it will be appreciated that embodiments described in connection with one of the aspects described herein may equally be applied to the other aspects.

DETAILED DESCRIPTION

Figure 1:
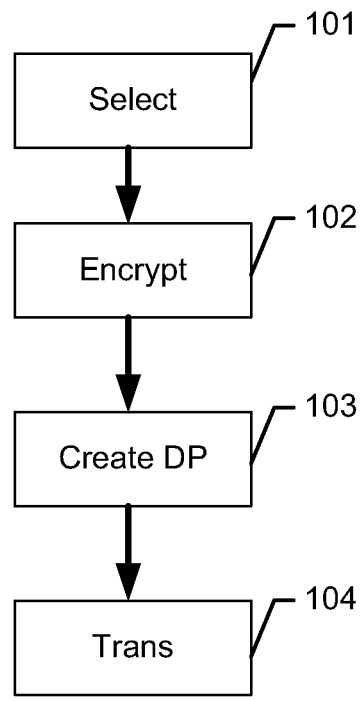
FIG. 1 shows a flow chart of a method of transmitting a data set comprising a first data package using encryption according to an embodiment of the present invention

Dealing now in more detail with creating customised encryption techniques, the following discussion concerns how to construct private versions of existing encryption techniques. The focus is on so-called block ciphers. A block cipher encrypts n-bit blocks to n-bit blocks using a key with κ bits for computing the n-bit cipher text for a given n-bit plain text, together with a decryption algorithm for computing the n-bit plain text corresponding to a given n-bit cipher text.

Most block ciphers are so-called iterated ciphers where the output is computed by applying in an iterative fashion a fixed key-dependent round function r times to the input. Such a cipher is called an r-round iterated (block) cipher. A key-schedule algorithm produces a set of sub-keys $k_1 \ldots k_r$ on input of the user-selected κ-bit key.

A function g, called the round function, is invertible when the first of two arguments is fixed. It is defined from:

$$z_i = g(k_i, z_{i-1}),$$

where $z_0$ is the plaintext, $k_i$ is the ith sub-key, and $z_r$ is the cipher-text.

In the following, encrypt (•,•) denotes the encryption routine and decrypt (•,•) denotes the corresponding decryption routine, such that encrypt (m,k) is the encrypted value of m using the key k, decrypt (c,k) is the decrypted value of c using the key k, and such that if encrypt (m,k)=c then decrypt (c,k)=m. Here m and c consists of n bits each and k consists of κ bits.

One method of increasing the effective key size in block ciphers is by key-whitening. One approach is the following. To encrypt an n-bit message x, do: y=encrypt $(x+k_1, k)+k_2$, where k is a κ-bit key, and $k_1$ and $k_2$ are n-bit keys. Alternatively, $k_1=k_2$ may be used. It has been shown in "Journal of Cryptology, Vol 14, No 1, pages 17-35, 2001", that for attacks not exploiting the internal structure the effective key size is $κ+n-\log_2 m$ bits, where m is the maximum number of plain text/cipher text pairs the attacker can obtain. That is, the effective key size is at least that of the original system, since $κ+n-\log_2 m ≥ κ$. Key-whitening can be used also to make customized variants of a block cipher.

Some encryption techniques have been designed to allow for customisations, e.g. by choosing some of the components in the design from a large set of primitives. One example is the wide-trail strategy behind the design of AES.

As for most block ciphers the AES can be split in some linear mappings and some non-linear mappings. In the wide-trail strategy these two sets of mappings are constructed independently according to some predefined sets of constraints. For any components satisfying these constraints the result is a secure encryption technique, where "secure" here is relative to the predefined constraints.

The estimated security levels of iterated block ciphers are often found by assuming that the sub-keys used in each iteration are independent. However, often the sub-keys are computed from the shorter user-selected key k in a so-called key-schedule. Further customisations of a system can be obtained by modifying the key-schedule.

It is also possible to use "module encryption". The typical number of rounds in a block cipher is 16 or 32, depending on the computational complexity of one round. In module encryption there is constructed a number of iterated ciphers, say s, each with a small number of rounds. From the secret key K there is generated a number of sub-keys to be used in the small ciphers. It can be assumed that the concatenation of t such small ciphers, each dependent on a different sub-key, yields a strong cipher, resistant against all known attacks. In this way it is possible to select $s^t$ variant ciphers.

Referring now in more detail to the drawings, FIG. 1 shows a flow chart of a method of transmitting a data set comprising a first data package using encryption according to an embodiment of the present invention.

In step 101 a first encryption technique is selected, wherein said first encryption technique comprises a first encryption algorithm for encrypting plain data into cipher data, and a first decryption algorithm for on provision of a specific key, decrypting cipher data and reproduce plain data. Next in step 102, a first encryption program implementing the first encryption algorithm of said first encryption technique is used to encrypt the first data package comprising plain data creating a first encrypted data package comprising cipher data. In step 103 a first decryption program implementing the first decryption algorithm of said first encryption technique is created. Finally in step 104, the first decryption program and the first encrypted data package are transmitted to the receiver. The first decryption program is configured such that at the receiver, upon provision of the specific key and the first encrypted data package, the first decryption program will decrypt the cipher data in the first encrypted data package and reproduce the plain data of the first data package. It should be appreciated that some or all of the steps may be performed in another sequential order and/or may be performed in parallel. The first encrypted data package and the first decryption program may be combined in a combined data package and transmitted to the receiver simultaneously. This may be beneficial for encryption tasks where all data is available to the encryption program at the start of the encryption process e.g. encryption of files, documents and/or e-mails. Alternatively/additionally, the first encrypted data package and/or subsequent encrypted data package(s) may be transmitted after the first decryption program is transmitted. This may be beneficial for encryption tasks where data becomes available to the encryption program over time e.g. encryption of data streams e.g. encryption of telephone or video telephone conversations.

Figure 2:
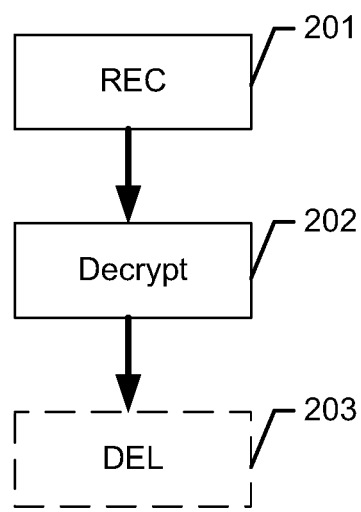
FIG. 2 shows a flow chart of a method of receiving and decrypting an encrypted data set according to an embodiment of the present invention.

FIG. 2 shows a flow chart of a method of receiving and decrypting an encrypted data set according to an embodiment of the present invention, wherein the encrypted data set comprises a first encrypted data package. In step 201 a first decryption program and the first encrypted data package is received, where the first encrypted data package comprises cipher data. Next, in step 202, the first encrypted data package is decrypted by providing the first decryption program with the first encrypted data package and a specific key. This results in a first data package comprising plain text. Optionally, in response to reception of instruction indicating that the entire data set has been received, the received decryption program is deleted, in step 203.

Figure 3:
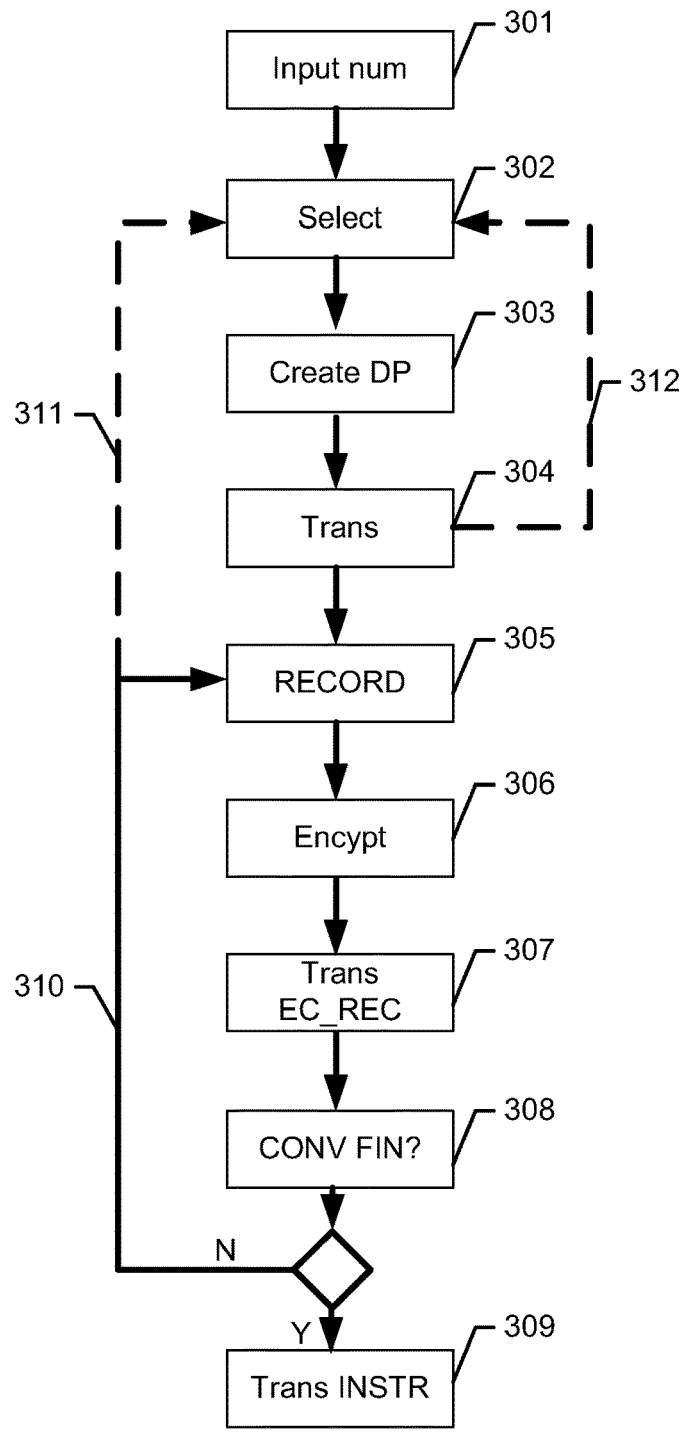
FIG. 3 shows a flow chart of a method of encrypting a telephone conversation, according to an embodiment of the present invention.

FIG. 3 shows a flow chart of a method of encrypting a telephone conversation, according to an embodiment of the present invention. In step 301, information is inputted indicative of a receiver of a call e.g. a telephone number or a username. Next, in step 302 a first encryption technique is selected, wherein the first encryption technique comprises a first encryption algorithm for encrypting plain data into cipher data, and a first decryption algorithm for on provision of a specific key, decrypting cipher data and reproduce plain data. Then in step 303, a decryption program is obtained implementing the decryption algorithm. In step 304, the decryption program is transmitted to the receiver. In step 305, the actual telephone conversation is started. This is done by recording a first (short) sound signal e.g. 5 ms, 10 ms 20 ms, or 50 ms and storing the recorded first sound signal in a first data package, where the first sound signal is stored as plain data. The first data package is then encrypted using a first encryption program, implementing the first encryption algorithm, creating a first encrypted data package comprising cipher data, in step 306. In step 307, the first encrypted data package is transmitted to the receiver. At the receiver, the first encrypted data package and the specific key is provided to the received decryption program, whereby the decryption program decrypt the cipher data in the first encrypted data package and reproduces the plain data of the first data package. The first sound signal stored as plain data can then be replayed at the receiver. Steps 305 to 307 are repeated 310 until the telephone conversation is finished. Thus, a second/third/fourth . . . sound signal is recorded and stored in a second/third/fourth . . . data package, encrypted, and transmitted to the receiver. Optionally, steps 302 to 304 are also repeated 311 within a single telephone conversation, whereby a second encryption technique is selected comprising a second encryption algorithm for encrypting plain data into cipher data, and a second decryption algorithm for on provision of a specific key, decrypting cipher data and reproduce plain data. A second decryption program is then obtained and transmitted to the receiver, and a second encryption program implementing the second encryption algorithm is then used in step 306 to encrypt subsequent data packages. Alternatively/additionally steps 302 to 304 may be repeated before the actual telephone conversation is started, whereby a plurality of encryption techniques are selected and a plurality of decryption programs are obtained and transmitted to the receiver before the actual telephone conversation is started. Additionally, a mapping function may be obtained and transmitted to the receiver, where the mapping function specifies the encryption techniques used for encrypting particular data packages. This will increase the security of the encryption used, as an interceptor possibly would be unaware of both the used encryption techniques and which encrypted data packages are encrypted with the same encryption technique. After the telephone conversation is finished, instructions may be transmitted to the receiver 309, where the instructions being such that at the receiver the one or more received decryption programs are deleted.

It should be appreciated that 302 to 309 may also be performed at the receiver to encrypt audio/speech of the receiver allowing a two-way encrypted telephone conversation. It should further be appreciated that some of the steps of the method may be performed in a different sequential order and/or in parallel e.g. step 305 may be performed in parallel with one or more of the other steps.

An example of code for decryption, run at the receiving apparatus, is as follows:

```
#include    "stdio.h"
void decrypt (int *ciphertext, int *key, int *plaintext)
{.......
plaintext = .....
}
main( )
{
printf("type in your key");
scanf(&key);
printf("type in ciphertext");
scanf(&ciphertext);
decrypt (ciphertext, key, plaintext)
printf("Plaintext is .......", plaintext);
exit(0);
}
```

Instead of a single encryption technique being selected from a library of techniques, in an alternative embodiment the plain text is divided into a number of blocks and the blocks are encrypted using different routines. These could be variants of a basic routine.

Below is an example of key-whitening according to an embodiment of the present invention. Assume A and B have exchanged a secret key k and that they wish to communicate secretly.

To encrypt an n-bit message m, A does the following:
1. Choose two random number, r1 and r2, each of n bits.
2. Compute c:=encrypt (m r1,k). r2.
3. w1:=encrypt (r1,k), w2:=encrypt (r2,k),
4. A writes a program with c, w1 and w2 built into it. The program does the following.
   takes as input the secret key k,
   computes r1=decrypt (w1,k), r2=decrypt (w2,k)
   subtracts the whitening key r2, ctemp:=ciphertext−r2,
   decrypts ctemp, ptemp:=decrypt (ctemp,k), and
   retrieves the plaintext, m:=ptemp−r1 and prints it
5. A compiles the program and sends the executable code to B In the above method there has only been specified the encryption of one n-bit block. However, the values of k, $r_1$ and $r_2$ can be used to encrypt many blocks of plain text. Alternatively, the sender can choose different values of $r_1$ and $r_2$ for every s consecutive n-bit block of plaintexts using the same value of k. However, the encryption speeds decreases for decreasing values of s.

An example of a program is given below:

```
var
   ciphertext = array [1..n]
   whitekey1 = array [1..n]
   whitekey2 = array [1..n]
   function dec (ciphertext, key)
   begin
   ....
   "decryption of ciphertext"
   return "temporary plaintext"
   end
/* Main program */
begin
   ciphertext := "ani92#!(kM1~>Q"
   whitekey1 := "a;e8ilf;l+M4!"
   whitekey2 := ")#MF138M2^(1M."
   write("Type in your key")
   read(key)
```

-continued

```
   r1 := decrypt(whitekey1,key)
   r2 := decrypt(whitekey2,key)
   ctemp := ciphertext − r2
   ptemp := decrypt(ctemp,key)
   plaintext := ptemp − r1
   write("Plain text is ....")
   write(plaintext)
end
```

There will now be discussed another example. The block cipher Serpent (see www.ramkilde.com/serpent) is a 32-round iterated block cipher. Serpent encrypts a 128-bit plain text block to a 128-bit cipher text block using a key of variable size of either 128, 192 or 256 bits. Each round takes a 128-bit round-key and uses one S-box. There are eight different S-boxes, numbered $S_0, S_1, \ldots, S_7$, which are used as follows; in round no. i the S-box is $S_{(i-1)mod 8}$. As an example, $S_0$ is used in the rounds numbered 1, 9, 17, and 25, and $S_1$ is used in the rounds numbered 2, 10, 18 and 26. All S-boxes are designed according to the same criteria and the order of how the S-boxes are used in Serpent is arbitrary. There are in total 40,320 different ways to order the eight S-boxes, which can be used to make customized systems. For Serpent the encryption goes as follows, where state is initialised with the plain text:
   for i:=1 to 32 do
   state:=round-function($S_{(i-1)mod 8}$,state)
   The final value of state is the ciphertext.

In a customized system, there can be chosen a permutation of the numbers {0,1,2,3,4,5,6,7}, specified by perm( ), and perm2( ), and then the encryption will be done as follows:
   for i:=1 to 32 do
   state:=round-function($S_{perm((i-1)mod 8)}$,state).

With perm={3, 5, 2, 6, 4, 1, 7, 0} $S_3$ would be used in the rounds numbered 1, 9, 17 and 25, and $S_5$ in the rounds numbered 2, 10, 18 and 26.

To make even more variants of Serpent, there could be chosen two different permutations of the numbers (0, 1, 2, 3, 4, 5, 6, 7), specified by perm(•) and perm2(.0. The encryption will then be done as follows:
   for i:=1 to 8 do
   state:=round-function($S_{perm((i-1)mod 8)}$,state)
   for i:=9 to 16 do
   state:=round-function($S_{perm2((i-1)mod 8)}$,state)
   for i:=17 to 24 do
   state:=round-function($S_{perm((i-1)mod 8)}$,state)
   for i:=25 to 32 do
   state:=round-function($S_{perm2((i-1)mod 8)}$,state)

Since there are 40,320 possible ways of specifying both perm and perm2, in total there would then be 1,625,702,400 different variants of Serpent.

A further example concerns the Advanced Encryption Standard (AES). This is an iterated block cipher which encrypts 128-bit blocks using keys of either 128, 192 or 256 bits. The only non-linear component and the core in AES is a so-called S-box, which is a table consisting of a permutation of all 256 values of a byte. Conventionally, this S-box has one special form. It is possible to generate many different S-boxes such that the resulting cryptosystem has equal security against the most common attacks (see the wide-trail strategy explained earlier). There are $256! \approx 10^{507}$ ways of choosing a permutation to be used in AES. However, it is not trivial to find the ones which lead to a strong encryption algorithm. An expert in block cipher design and cryptanalysis is able to produce a large set of S-boxes, say 10,000 boxes. In an encryption scenario the sender can choose one of these boxes at random and incorporate it in the encryption and decryption operations. The sender would encrypt his message, incorporate the ciphertext in a decryption program, compile the program and send the executable code to the receiver.

The key-schedule of the AES takes the user-selected key of κ bits and produces a set of round keys each of 128 bits. The only non-linear component in the key-schedule algorithm is the S-box from the encryption routine mentioned above. A further customisation can thus be obtained by selecting the S-box used in the key-schedule out of the pool of 10,000 boxes generated above. In total this leads to 100,000,000 different variants of the AES.

Thus it has been shown how different encryption routines can be generated from a basic encryption technique. These can be applied to different portions of the plain text.

It will be appreciated that in general the encryption technique or encryption techniques used are unknown to the intended recipient of the data. Similarly, the decryption routine or decryption routines used are unknown to the intended recipient of the data, and in general the decryption routine or decryption routines are available to the receiving apparatus only when the program is run after the key has been provided. They are not pre-installed on the receiving apparatus.

Disclosed are methods and systems according to any of the following items.

Item 1. A method of transmitting a data set using encryption, wherein the data set comprises a first data package, and wherein the method comprises the steps of:
selecting a first encryption technique, wherein said first encryption technique comprises a first encryption algorithm for encrypting plain data into cipher data, and a first decryption algorithm for on provision of a specific key, decrypting cipher data and reproduce plain data;
encrypting the first data package comprising plain data, using a first encryption program implementing the first encryption algorithm of said first encryption technique, creating a first encrypted data package comprising cipher data;
obtaining a first decryption program implementing the first decryption algorithm of said first encryption technique; and
transmitting said first decryption program and/or said first encrypted data package to a receiver,
wherein the first decryption program being such that at the receiver, upon provision of the specific key and the first encrypted data package, the first decryption program will decrypt the cipher data in the first encrypted data package and reproduce the plain data of the first data package.

Item 2. A method according to item 1, wherein the step of selecting an encryption technique comprises selecting an encryption technique from a plurality of encryption techniques.

Item 3. A method according to any of items 1 to 2, wherein the encryption technique is selected by an encryption management system.

Item 4. A method according to any of items 1 to 3, wherein the step of selecting an encryption technique comprises selecting an encryption technique from a plurality of encryption techniques dependent on a random and/or pseudo random event.

Item 5. A method according to any of items 1 to 4, wherein said data set further comprises a second data package, and wherein the method further comprises the steps of:
encrypting the second data package comprising plain data, using the first encryption program, creating a second encrypted data package comprising cipher data;
transmitting said second encrypted data package to a receiver,
wherein the first decryption program further being such that at the receiver, upon provision of the specific key and the second encrypted data package, the first decryption program will decrypt the cipher data in the second encrypted data package and reproduce the plain data of the second data package.

Item 6. A method according to any of items 1 to 5, wherein the first decryption program is compiled into an executable program prior to being transmitted.

Item 7. A method according to any of items 1 to 6, wherein the first encryption technique is a custom encryption technique generated using an encryption technique generating program.

Item 8. A method according to any of items 1 to 7, wherein the data set further comprises a third data package, wherein the method further comprises the steps of:
selecting a second encryption technique, wherein said second encryption technique comprises a second encryption algorithm for encrypting plain data into cipher data, and a second decryption algorithm for on provision of a specific key, decrypting cipher data and reproduce plain data;
encrypting the third data package comprising plain data, using a second encryption program implementing the second encryption algorithm of said second encryption technique, creating a thirds encrypted data package comprising cipher data;
obtaining a second decryption program implementing the second decryption algorithm of said second encryption technique; and
transmitting said second decryption program and/or said third encrypted data package to a receiver,
wherein the second decryption program being such that at the receiver, upon provision of the specific key and the third encrypted data package, the second decryption program will decrypt the cipher data in the third encrypted data package and reproduce the plain data of the third data package.

Item 9. A method according to any of items 1 to 8, wherein the entire data set is transmitted contiguous in a single data package or in a plurality of data packages transmitted with an insignificant time gap between the individual data packages.

Item 10. A method according to any of items 1 to 9, wherein the method further comprises transmitting instructions that signals to the receiver that the transmission has finished, the instructions being such that at the receiver the first decryption program is deleted.

Item 11. A system for transmitting and receiving data using encryption, wherein the system comprises a receiving apparatus for receiving encrypted data and a transmitting apparatus for transmitting encrypted data, wherein the system is configured to transmit a data set comprising a first data package, using encryption by:
selecting a first encryption technique, wherein said first encryption technique comprises a first encryption algorithm for encrypting plain data into cipher data, and a first decryption algorithm for on provision of a specific key, decrypting cipher data and reproduce plain data;
obtaining a first decryption program implementing the first decryption algorithm of said first encryption technique; and optionally transmitting said first decryption program to said receiving apparatus;

encrypting in the transmitting apparatus, the first data package comprising plain data, using a first encryption program implementing the first encryption algorithm of said first encryption technique, creating a first encrypted data package comprising cipher data;

transmitting from the transmitting apparatus the first encrypted data package to the receiving apparatus; and decrypting in the receiving apparatus using the first decryption program and the specific key the first encrypted data package, wherein the plain data of the first data package is reproduced an made available to the receiving apparatus.

Item 12. A system according to item 11 wherein the receiving apparatus is further configured to delete the first decryption program after the transmission of the data set is completed.

Item 13. A system according to any of items 11 to 12, wherein the system is configured to transmit the entire data set contiguous in a single data package or in a plurality of data packages transmitted without a significant time gap between the individual data packages.

Item 14. A system according to any of items 11 to 13, wherein the first encryption technique is selected from a plurality of encryption techniques.

Item 15. A system according to any of items 11 to 14, wherein the first encryption technique is selected by an encryption management system.

Item 16. A system according to any of items 11 to 15, wherein the step of selecting an encryption technique comprises selecting an encryption technique from a plurality of encryption techniques dependent on a random and/or pseudo random event.

Item 17. A system according to any of items 11 to 16, wherein the data set further comprises a second data package and the system further is configured to:

encrypting the second data package comprising plain data, using the first encryption program of said first encryption technique, creating a second encrypted data package comprising cipher data;

transmitting said second encrypted data package to a receiver, wherein the first decryption program being such that at the receiver, upon provision of the specific key and the second encrypted data package, the decryption program will decrypt the cipher data in the second encrypted data package and reproduce the plain data of the second data package.

Item 18. A system according to any of items 11 to 17, wherein the first decryption program is compiled into an executable program prior to being transmitted.

Item 19. A system according to any of items 11 to 18, wherein the first encryption technique is a custom encryption technique generated using an encryption technique generating program.

Item 20. A system according to any of items 11 to 19, wherein the data set further comprises a third data package and the system further is configured to:

selecting a second encryption technique, wherein said second encryption technique comprises a second encryption algorithm for encrypting plain data into cipher data, and a second decryption algorithm for on provision of a specific key, decrypting cipher data and reproduce plain data;

obtaining a second decryption program implementing the second decryption algorithm of said second encryption technique; and optionally transmitting said second decryption program to said receiving apparatus;

encrypting in the transmitting apparatus the third data package comprising plain data, using a second encryption program implementing the second encryption algorithm of said second encryption technique, creating a third encrypted data package comprising cipher data;

transmitting from the transmitting apparatus the third encrypted data package to the receiving apparatus; and decrypting in the receiving apparatus using the second decryption program and the specific key the third encrypted data package, wherein the plain data of the third data package is reproduced and made available to the receiving apparatus.

Item 21. A system for transmitting and receiving data using encryption according to items 11 to 12, wherein the system further is configured to perform a second transmission and wherein there is a significant temporal gap between the end of the first transmission and the start of the second transmission, and wherein the selected encryption technique used for the first transmission differs from the selected encryption technique used for the second transmission.

Item 22. A method of receiving and decrypting an encrypted data set, wherein the encrypted data set comprises a first encrypted data package, wherein the method comprises the steps of:

receiving a first decryption program and the first encrypted data package, wherein the first encrypted data package comprises cipher data;

decrypting the first encrypted data package by providing the first decryption program with the first encrypted data package and a specific key, creating a first data package comprising plain text.

Item 23. A method according to item 22, wherein the encrypted data set further comprises a second encrypted data package, and wherein the method further comprises the steps of:

receiving the second encrypted data package, wherein the second encrypted data package comprises cipher data;

decrypting the second encrypted data package by providing the first decryption program with the second encrypted data package and the specific key, creating a second data package comprising plain text.

Item 24. A method according to any of items 22 to 23, wherein the first decryption program comprises compiled executable code.

Item 25. A method according to any of items 22 to 24, wherein the encrypted data set further comprises a third encrypted data package, wherein the method further comprises the steps of:

receiving a second decryption program and/or said third encrypted data package;

decrypting the third encrypted data package by providing the second decryption program with the third encrypted data package and a specific key, creating a third data package comprising plain text.

Item 26. A method according to any of items 22 to 25, wherein the entire data set is received contiguous in a single data package or in a plurality of data packages received without a significant time gap between the individual data packages.

Item 27. A method according to any of items 22 to 26, wherein the method further comprises receiving instructions that signals that the transmission of the data set has finished, and deleting the first decryption program in response to the received instructions.

Item 28. A method of transmitting a first data set using encryption and a second data set using encryption, wherein the transmission of the first data set and the transmission of the second data set is performed using a method according to any of items 1 to 10, wherein there is a temporal gap between the end of the transmission of the first data set and the start of the transmission of the second data set, and wherein the selected encryption technique used for the transmission of the first data set differs from the selected encryption technique used for the transmission of the second dataset.

Item 29. A transmitting apparatus configured to encrypt and transmit a data set using a method according to any of items 1 to 10.

Item 30. A receiving apparatus configured to receive and decrypt an encrypted data set, using a method according to any of items 22 to 27.

Item 31. A data processing system having stored thereon program code means adapted to cause the data processing system to perform the steps of the method according to any one of items 1 through 10 or items 22 to 27, when said program codes means are executed on the data processing system.

Item 32. A computer program product comprising program code means adapted to cause a data processing system to perform the steps of the method according to any one of items 1 to 10 or items 22 to 27, when said program code means are executed on the data processing system.

Item 33. A computer program product according to item 32, comprising a computer-readable medium having stored thereon the program code means.

Item 34. A computer data signal embodied in a carrier wave and representing sequences of instructions which, when executed by a processor, cause the processor to perform the steps of the method according to any one of items 1 to 10 or 22 to 27.

The invention claimed is:

1. A method of encrypting a telephone conversation between a first smart phone and a second smart phone by transmitting a data set using encryption, wherein the data set comprises a first data package, the method comprising the steps of:
    automatically selecting, with the first smart phone, a first encryption technique from a plurality of encryption techniques with an encryption management system, wherein said first encryption technique comprises a first encryption algorithm for encrypting plain data into cipher data, and a first decryption algorithm for on provision of a specific key, decrypting cipher data encrypted with the first encryption algorithm and reproducing plain data;
    encrypting, with the first smart phone, the first data package comprising plain data of the telephone conversation, using a first encryption program implementing the first encryption algorithm of said first encryption technique, to create a first encrypted data package comprising cipher data;
    obtaining a first decryption program implementing the first decryption algorithm of said first encryption technique;
    transmitting only the first decryption program with or without the first encrypted data package to a receiver being the second smart phone, and
    providing the specific key for decrypting cipher data separately from the first decryption program,
    wherein the first decryption program being such that at the second smart phone, upon provision of the specific key and the first encrypted data package, the first decryption program will decrypt the cipher data in the first encrypted data package and reproduce the plain data of the first data package.

2. The method according claim 1, wherein the step of selecting an encryption technique comprises selecting an encryption technique from a plurality of encryption techniques dependent on a random event and/or a pseudo random event.

3. The method according to claim 1, wherein the step of selecting an encryption technique comprises selecting an encryption technique in accordance with a set rota.

4. The method according to claim 1, wherein the plurality of encryption techniques comprises at least one hundred encryption techniques.

5. The method according to claim 1, wherein said data set further comprises a second data package, and wherein the method further comprises the steps of:
    encrypting the second data package comprising plain data, using the first encryption program, creating a second encrypted data package comprising cipher data;
    transmitting said second encrypted data package to a receiver,
wherein the first decryption program further being such that at the receiver, upon provision of the specific key and the second encrypted data package, the first decryption program will decrypt the cipher data in the second encrypted data package and reproduce the plain data of the second data package.

6. The method according to claim 1, wherein the first decryption program is compiled into an executable program prior to being transmitted.

7. The method according to claim 1, wherein the first encryption technique is a custom encryption technique generated using an encryption technique generating program.

8. The method according to claim 1, wherein the data set further comprises a third data package, wherein the method further comprises the steps of:
    selecting a second encryption technique, wherein said second encryption technique comprises a second encryption algorithm for encrypting plain data into cipher data, and a second decryption algorithm for on provision of a specific key, decrypting cipher data and reproduce plain data;
    encrypting the third data package comprising plain data, using a second encryption program implementing the second encryption algorithm of said second encryption technique, creating a third encrypted data package comprising cipher data;
    obtaining a second decryption program implementing the second decryption algorithm of said second encryption technique; and
    transmitting said second decryption program and/or said third encrypted data package to a receiver,
wherein the second decryption program being such that at the receiver, upon provision of the specific key and the third encrypted data package, the second decryption program will decrypt the cipher data in the third encrypted data package and reproduce the plain data of the third data package.

9. The method according to claim 1, wherein the entire data set is transmitted contiguous in a single data package or in a plurality of data packages transmitted with an insignificant time gap between the individual data packages.

10. The method according to claim 1, wherein the method further comprises transmitting instructions that signals to the receiver that the transmission has finished, the instructions being such that at the receiver the first decryption program is deleted.

11. A telephone conversation system for transmitting and receiving data using encryption, the system comprising a receiving apparatus for receiving encrypted data and a transmitting apparatus for transmitting encrypted data, wherein the system is configured to transmit a data set comprising a first data package of a telephone conversation, using encryption by:
   automatically selecting, with a first smart phone as the transmitting apparatus, a first encryption technique from a plurality of encryption techniques with an encryption management system, wherein said first encryption technique comprises a first encryption algorithm for encrypting plain data into cipher data, and a first decryption algorithm for on provision of a specific key, decrypting cipher data encrypted with the first encryption algorithm and reproducing plain data;
   obtaining a first decryption program implementing the first decryption algorithm of said first encryption technique; and
   transmitting, with the first smart phone, only the first decryption program to said receiving apparatus;
   encrypting in the transmitting apparatus, the first data package comprising plain data of the telephone conversation, using a first encryption program implementing the first encryption algorithm of said first encryption technique, to create a first encrypted data package comprising cipher data;
   transmitting from the transmitting apparatus the first encrypted data package to the receiving apparatus;
   providing the specific key for decrypting cipher data separately from the first decryption program,
   decrypting, with a second smart phone as the receiving apparatus using the first decryption program and the specific key the first encrypted data package, wherein the plain data of the first data package is reproduced and made available to the receiving apparatus.

12. The system according to claim 11 wherein the receiving apparatus is further configured to delete the first decryption program after the transmission of the data set is completed.

13. The system according to claim 11, wherein the data set further comprises a second data package and the system further is configured to:
   encrypting the second data package comprising plain data, using the first encryption program of said first encryption technique, creating a second encrypted data package comprising cipher data;
   transmitting said second encrypted data package to a receiver,
wherein the first decryption program being such that at the receiver, upon provision of the specific key and the second encrypted data package, the decryption program will decrypt the cipher data in the second encrypted data package and reproduce the plain data of the second data package.

14. The system according to claim 11, wherein the data set further comprises a third data package and the system further is configured to:
   selecting a second encryption technique, wherein said second encryption technique comprises a second encryption algorithm for encrypting plain data into cipher data, and a second decryption algorithm for on provision of a specific key, decrypting cipher data and reproduce plain data;
   obtaining a second decryption program implementing the second decryption algorithm of said second encryption technique; and
   optionally transmitting said second decryption program to said receiving apparatus;
   encrypting in the transmitting apparatus the third data package comprising plain data, using a second encryption program implementing the second encryption algorithm of said second encryption technique, creating a third encrypted data package comprising cipher data;
   transmitting from the transmitting apparatus the third encrypted data package to the receiving apparatus; and
   decrypting in the receiving apparatus using the second decryption program and the specific key the third encrypted data package, wherein the plain data of the third data package is reproduced and made available to the receiving apparatus.

15. The system for transmitting and receiving data using encryption according to claim 11, wherein the system further is configured to perform a second transmission and wherein there is a significant temporal gap between the end of the first transmission and the start of the second transmission, and wherein the selected encryption technique used for the first transmission differs from the selected encryption technique used for the second transmission.

* * * * *